(12) United States Patent
Jang

(10) Patent No.: US 12,070,935 B2
(45) Date of Patent: Aug. 27, 2024

(54) DISPLAY DEVICE

(71) Applicant: Samsung Display Co., Ltd., Yongin-Si (KR)

(72) Inventor: Minsok Jang, Asan-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 228 days.

(21) Appl. No.: 17/717,358

(22) Filed: Apr. 11, 2022

(65) Prior Publication Data

US 2022/0418117 A1    Dec. 29, 2022

(30) Foreign Application Priority Data

Jun. 28, 2021 (KR) ........................ 10-2021-0084247

(51) Int. Cl.
| | | |
|---|---|---|
| *B32B 7/12* | (2006.01) | |
| *B32B 3/08* | (2006.01) | |
| *B32B 3/18* | (2006.01) | |
| *H04M 1/02* | (2006.01) | |

(52) U.S. Cl.
CPC ................ *B32B 7/12* (2013.01); *B32B 3/085* (2013.01); *B32B 3/18* (2013.01); *B32B 2307/7376* (2023.05); *B32B 2457/20* (2013.01); *H04M 1/0268* (2013.01)

(58) Field of Classification Search
CPC .. B32B 3/085; B32B 3/18; B32B 7/12; B32B 2307/7376; B32B 2457/20; H04M 1/0268
See application file for complete search history.

(56) References Cited

U.S. PATENT DOCUMENTS

| | | | |
|---|---|---|---|
| 10,820,433 B2 | 10/2020 | Cha | |
| 11,032,920 B2 | 6/2021 | Kim | |
| 11,348,488 B2 * | 5/2022 | Jang | .............. H04M 1/0216 |
| 11,805,607 B2 * | 10/2023 | Jang | .............. G06F 1/1652 |
| 2009/0174832 A1 * | 7/2009 | Lee | .............. G06F 3/045 |
| | | | 349/43 |
| 2015/0192951 A1 * | 7/2015 | Chong | ............ G02F 1/133305 |
| | | | 359/894 |
| 2019/0361286 A1 * | 11/2019 | Jang | .............. G02F 1/133308 |
| 2020/0184857 A1 | 6/2020 | Lee | |

FOREIGN PATENT DOCUMENTS

| | | |
|---|---|---|
| KR | 10-2020-0061275 A | 6/2020 |
| KR | 10-2020-0070899 A | 6/2020 |
| KR | 10-2020-0095307 A | 8/2020 |
| WO | WO-2022262049 A1 * 12/2022 | ........... H05K 5/0217 |

\* cited by examiner

*Primary Examiner* — Gerard Higgins
(74) *Attorney, Agent, or Firm* — Innovation Counsel LLP

(57) ABSTRACT

A display device includes a display module including a first non-folding area, a second non-folding area, and a folding area disposed between the first non-folding area and the second non-folding area and a support layer disposed under the display module. The support layer includes a first support plate, a second support plate disposed under the first support plate, and a spacer disposed between the first support plate and the second support plate. The spacer includes a main spacer and a sub-spacer alternately arranged with the main spacer in a first direction, the main spacer has a thickness greater than a thickness of the sub-spacer, and a length of the spacer in a second direction crossing the first direction is greater than a length of the first support plate in the second direction.

21 Claims, 13 Drawing Sheets

DISPLAY DEVICE

CROSS-REFERENCE TO RELATED APPLICATION

This U.S. non-provisional patent application claims priority under 35 U.S.C. § 119 to Korean Patent Application No. 10-2021-0084247, filed on Jun. 28, 2021, the contents of which are hereby incorporated by reference in its entirety.

BACKGROUND

1. Field of Disclosure

The present disclosure relates to a display device. More particularly, the present disclosure relates to a display device that is foldable.

2. Description of the Related Art

A display device includes a display area that is activated in response to electrical signals applied thereto. The display device senses an external input applied thereto from the outside through the display area and displays various images through the display area to provide a user with information. In recent years, as display devices having a variety of shapes are being developed, the display area is implemented to have various shapes. Particularly, a display device that includes a flexible display member to be foldable, bendable, or rollable is being developed, and thus, it is easy to carry the display device and a user's convenience is improved.

SUMMARY

The present disclosure provides a display device having improved impact resistance.

Embodiments of the inventive concept provide a display device including a display module including a first non-folding area, a second non-folding area, and a folding area disposed between the first non-folding area and the second non-folding area and a support layer disposed under the display module. The support layer includes a first support plate, a second support plate disposed under the first support plate, and a spacer disposed between the first support plate and the second support plate. The spacer includes a main spacer and a sub-spacer alternately arranged with the main spacer in a first direction, the main spacer has a thickness greater than a thickness of the sub-spacer, and a length of the spacer in a second direction crossing the first direction is greater than a length of the first support plate in the second direction.

Each of the main spacer and the sub-spacer is provided in plural, and the main spacers are spaced apart from the sub-spacers in the first direction.

The first support plate includes a first plate disposed to correspond to the first non-folding area of the display module and a second plate spaced apart from the first plate in the folding area and disposed to correspond to the second non-folding area of the display module. The second support plate includes a third plate disposed to correspond to the first plate and a fourth plate spaced apart from the third plate in the folding area and disposed to correspond to the second plate.

The display device further includes a first adhesive disposed between the first plate and the second plate and a second adhesive disposed between the third plate and the fourth plate. The first adhesive and the second adhesive include a flexible adhesive.

The spacer includes an elastic resin, a carbon fiber, or a glass fiber.

The spacer includes a first portion that overlaps the first support plate and the second support plate in a plan view and a plurality of second portions that extends from the first portion to the second direction and does not overlap the first support plate and the second support plate.

The first portion of the spacer has a first state in a first mode in which the support layer is folded and has a second state in which the first portion is stretched in the second direction in a second mode in which the support layer is unfolded.

The display device further includes a cover disposed under the second support plate, the cover includes a first roller and a second roller disposed at distal ends of the spacer, and the second portions of the spacer are respectively fixed to the first roller and the second roller.

When the first mode is switched to the second mode, the second portions are wound around the first roller and the second roller and move in a direction away from the first portion.

A length of the first portion in the second mode is greater than a length of the first portion in the first mode.

The display device further includes a cover disposed under the second support plate, and the cover includes a first fixing portion and a second fixing portion respectively fixing the second portions in the first mode and moving the second portions in a direction away from the first portion to stretch the first portion in the second mode.

The main spacer is in contact with the first support plate and the second support plate, the sub-spacer is in contact with only one of the first support plate and the second support plate, and a first inner space is formed between the sub-spacer and the other of the first support plate and the second support plate.

The first support plate includes a first lattice portion overlapping the folding area and provided with a plurality of opening areas, and the second support plate includes a second lattice portion overlapping the folding area and provided with a plurality of opening areas.

The spacer has a first width in an area overlapping the first and second non-folding areas and has a second width in an area overlapping the folding area, and the first width is greater than the second width.

Embodiments of the inventive concept provide a display device including a display module including a first non-folding area, a second non-folding area, and a folding area disposed between the first non-folding area and the second non-folding area and a support layer disposed under the display module. The support layer includes a first support plate, a second support plate disposed under the first support plate, and a spacer disposed between the first support plate and the second support plate. A tensile force applied to the spacer is greater in a first mode in which the spacer is folded than in a second mode in which the spacer is unfolded.

The spacer includes a first portion that overlaps the first support plate and a second portion that extends from the first portion and does not overlap the first support plate, and a length of the second portion in the first mode is smaller than a length of the second portion in the second mode.

The display device further includes a cover disposed under the support layer, fixing the second portion, and moving the fixed second portion in a direction away from the first portion to stretch the first portion in the second mode.

The spacer includes a main spacer and a sub-spacer alternately arranged with the main spacer in a first direction, and the main spacer has a thickness greater than a thickness of the sub-spacer.

The display device further includes a protective layer disposed between the display module and the support layer.

Embodiments of the inventive concept provide a display device including a display module including a first non-folding area, a second non-folding area, and a folding area defined between the first non-folding area and the second non-folding area, a first support layer disposed under the display module and including a lattice portion overlapping the folding area and provided with a plurality of opening areas defined therein, and a second support layer disposed under the first support layer. The second support layer includes a first support plate, a second support plate disposed under the first support plate, and a spacer disposed between the first support plate and the second support plate. The spacer includes a main spacer and a sub-spacer alternately arranged with the main spacer in a first direction, the main spacer has a thickness greater than a thickness of the sub-spacer, and a length of the spacer in a second direction crossing the first direction is greater than a length of the first support plate in the second direction.

The first support plate includes a first plate disposed to correspond to the first non-folding area of the display module and a second plate spaced apart from the first plate in the folding area and disposed to correspond to the second non-folding area of the display module. The second support plate includes a third plate disposed to correspond to the first plate and a fourth plate spaced apart from the third plate in the folding area and disposed to correspond to the second plate.

According to the above, as the display device includes the support plate provided with the main spacer and the sub-spacer having a thickness less than that of the main spacer, the strain is reduced and the impact resistance is improved.

In addition, the display device includes the cover that fixes the main spacer and the sub-spacer, and the main spacer and the sub-spacer are stretched by the cover when the display device is being unfolded. Thus, the deformation of a folding portion is reduced and the impact resistance is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1A:
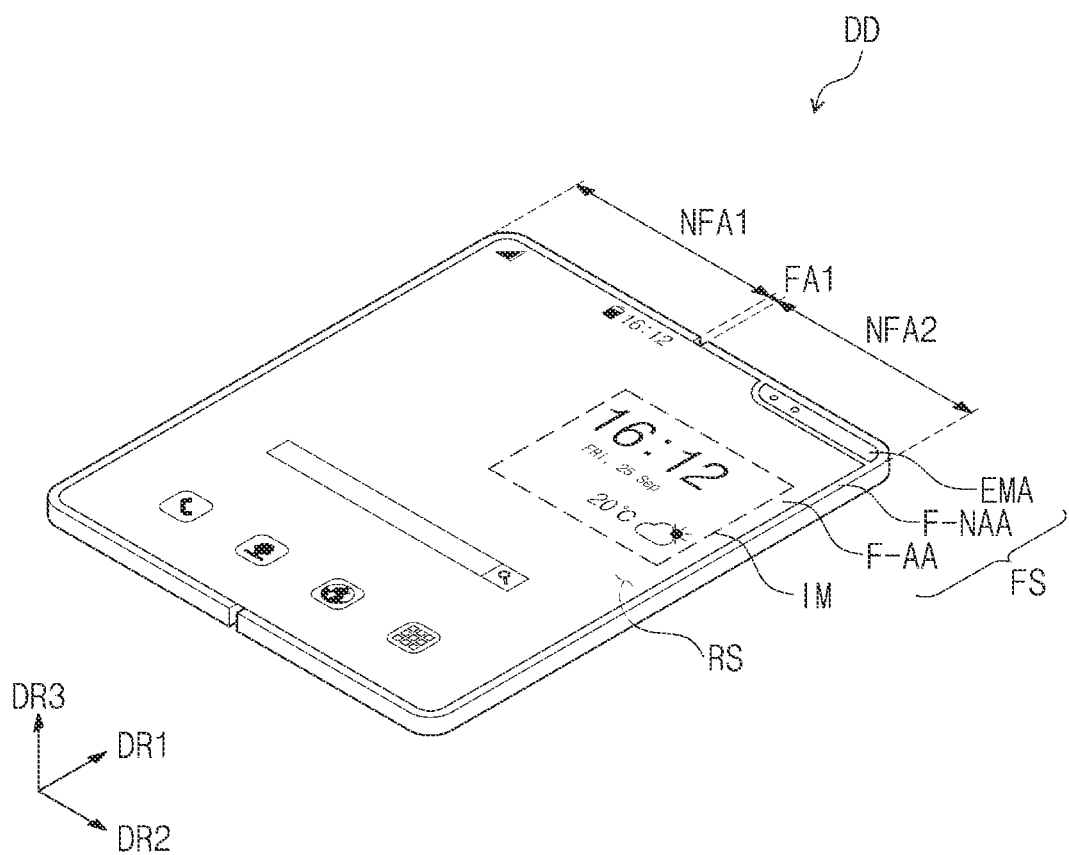
FIG. 1A is a perspective view showing a display device in an unfolded state according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 1B:
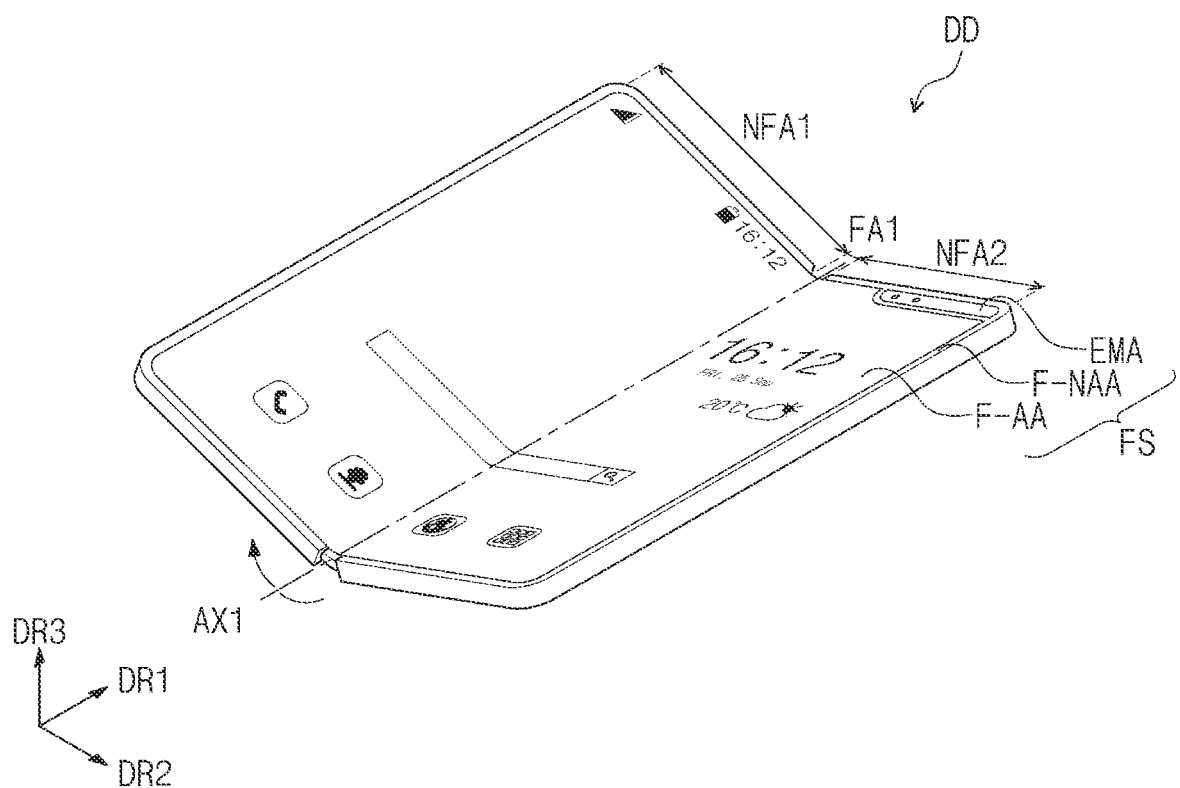
FIG. 1B is a perspective view showing a display device being inwardly folded according to an embodiment of the present disclosure.
Figure 1C:
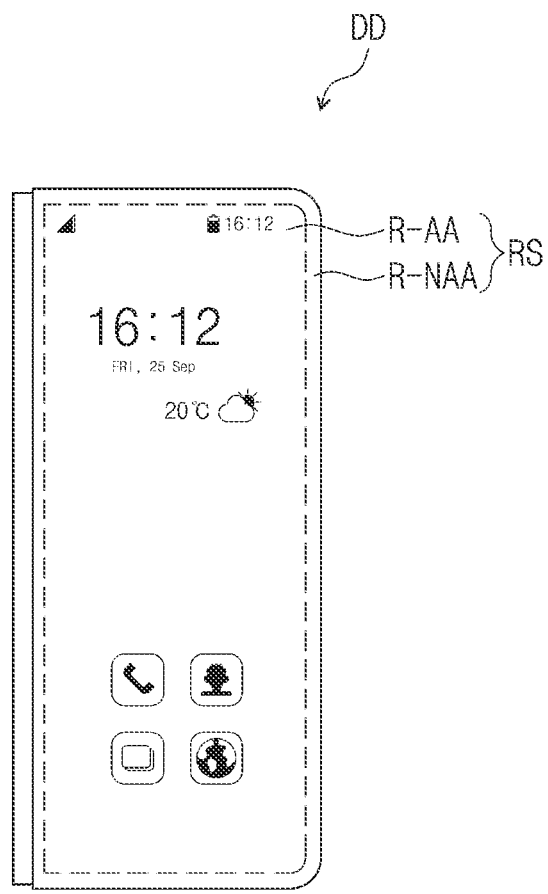
FIG. 1C is a plan view showing a display device in an inwardly folded state according to an embodiment of the present disclosure.
Figure 1C:
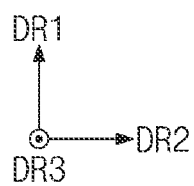
Figure 1D:
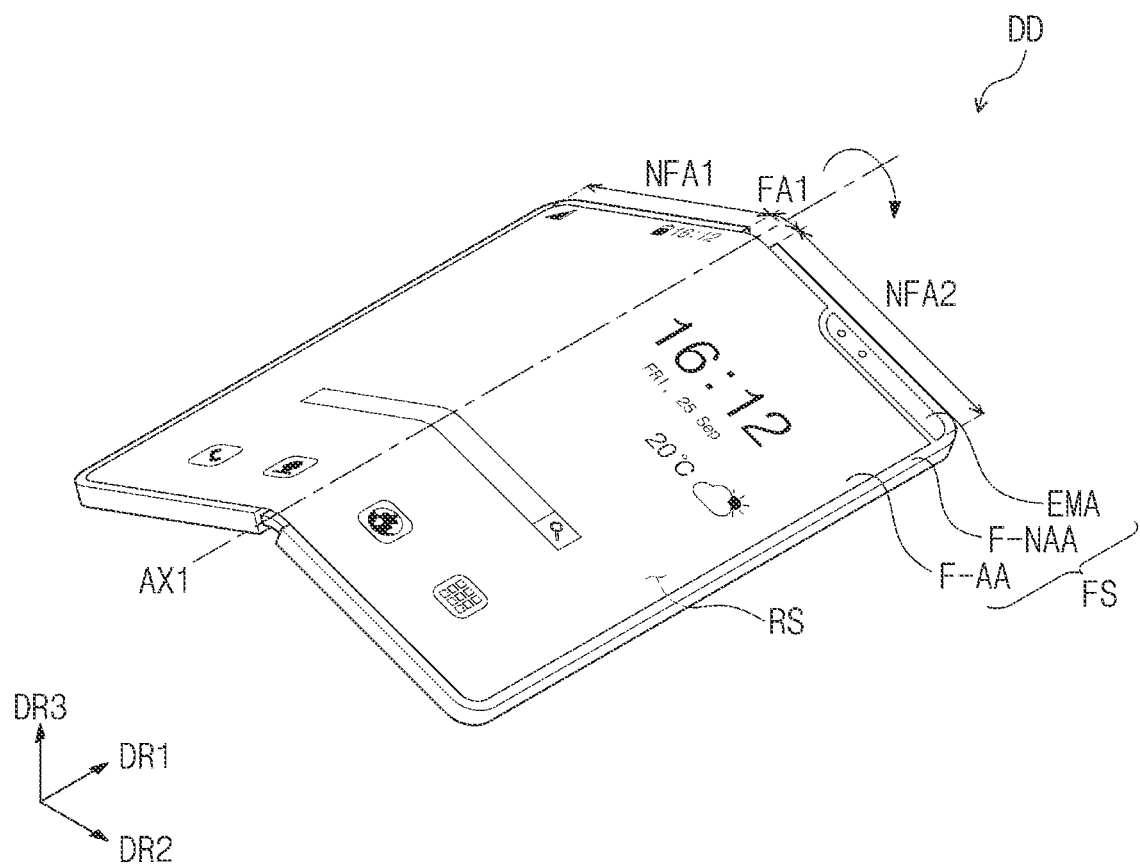
FIG. 1D is a perspective view showing a display device being outwardly folded according to an embodiment of the present disclosure.

FIG. 1A is a perspective view showing a display device DD in an unfolded state according to an embodiment of the present disclosure. FIG. 1B is a perspective view showing the display device DD being inwardly folded according to an embodiment of the present disclosure. FIG. 1C is a plan view showing the display device DD in an inwardly folded state according to an embodiment of the present disclosure. FIG. 1D is a perspective view showing the display device DD being outwardly folded according to an embodiment of the present disclosure.

Referring to FIG. 1A, the display device DD may be a device that is activated in response to an electrical signal. The display device DD may include various embodiments. For example, the display device DD may include a tablet computer, a notebook computer, a computer, a smart television, or the like. In the present embodiment, a foldable smartphone will be described as the display device DD.

The display device DD may display an image IM through a first display surface FS toward a third direction DR3, which is substantially parallel to each of a first direction DR1 and a second direction DR2. The first display surface FS through which the image IM is displayed may correspond to a front surface of the display device DD. The image IM may include a moving image and a still image. FIG. 1A shows an internet search box and a clock widget as an example of the image IM.

In the present embodiment, front (or upper) and rear (or lower) surfaces of each member of the display device DD may be defined with respect to a direction in which the image IM is displayed. The front and rear surfaces may be opposite to each other in the third direction DR3 and a normal line direction of each of the front and rear surfaces may be substantially parallel to the third direction DR3.

A distance between the front surface and the rear surface in the third direction DR3 may correspond to a thickness or a height of the display device DD in the third direction DR3. Meanwhile, directions indicated by the first, second, and third directions DR1, DR2, and DR3 may be relative to each other and may be changed to other directions.

The display device DD may sense an external input applied thereto from an outside. The external input may include various forms of inputs provided from the outside of the display device DD. For example, the external inputs may include a proximity input (e.g., hovering) applied when approaching close to or adjacent to the display device DD at a predetermined distance as well as a touch input by a part of a user's body (e.g., a user's hand). In addition, the external inputs may be provided in the form of force, pressure, temperature, light, etc.

The display device DD may include the first display surface FS and a second display surface RS. The first display surface FS may include a first active area F-AA, a first peripheral area F-NAA, and an electronic module area EMA. The second display surface RS may be opposite to at least a portion of the first display surface FS. That is, the second display surface RS may be defined as a portion of a rear surface of the display device DD.

The first active area F-AA may be activated in response to the electrical signal. The image IM may be displayed through the first active area F-AA, and various external inputs may be sensed through the first active area F-AA. The first peripheral area F-NAA may be defined adjacent to the first active area F-AA. The first peripheral area F-NAA may have a predetermined color. The first peripheral area F-NAA may surround the first active area F-AA. Accordingly, the first active area F-AA may have a shape that is substantially defined by the first peripheral area F-NAA, however, this is merely one example. The first peripheral area F-NAA may be defined adjacent to only one side of the first active area F-AA or may be omitted. According to an embodiment, the display device DD may include the active area of various shapes, and it should not be particularly limited.

Various electronic modules may be disposed in the electronic module area EMA. For example, the electronic modules may include at least one of a camera, a speaker, an optical sensor, and a thermal sensor. An external object may be sensed through the electronic module area EMA of the first display surface FS or the second display surface RS, or a sound signal, such as a voice, may be provided to the outside through the electronic module area EMA of the first display surface FS or the second display surface RS. In addition, the electronic module may include a plurality of components, however, it should not be limited to a particular embodiment.

The electronic module area EMA may be surrounded by the first active area F-AA and the first peripheral area F-NAA, however, it should not be limited thereto or thereby. The electronic module area EMA may be defined in the first active area F-AA, and the electronic module area EMA should not be particularly limited.

The display device DD according to the present embodiment may include at least one folding area FA1 and a plurality of non-folding areas NFA1 and NFA2 extending from the folding area FA1. The non-folding areas NFA1 and NFA2 may be spaced apart from each other with the folding area FA1 interposed therebetween.

Referring to FIG. 1B, the display device DD may include a folding axis AX1 that is imaginary axis and extends in the first direction DR1. The folding axis AX1 may extend in the first direction DR1 on the first display surface FS. That is, the folding axis AX1 may extend in a major axis direction of the display device DD.

According to the present embodiment, the non-folding areas NFA1 and NFA2 may be disposed adjacent to the folding area FA1 with the folding area FA1 interposed therebetween. For example, a first non-folding area NFA1 may be disposed adjacent to one side of the folding area FA1 in the second direction DR2, and a second non-folding area NFA2 may be disposed adjacent to the other side of the folding area FA1 in the second direction DR2.

The display device DD may be folded about the folding axis AX1 to be in the inwardly folded state where one area of the first display surface FS, which overlaps the first non-folding area NFA1, faces the other area of the first display surface FS, which overlaps the second non-folding area NFA2.

Referring to FIG. 1C, the second display surface RS may be viewed by a user during the inwardly folded state of the display device DD. In this case, the second display surface RS may include a second active area R-AA through which the image is displayed and a second peripheral area R-NAA adjacent to the second active area R-AA. The second active area R-AA may be activated in response to electrical signals. The second active area R-AA may be an area through which the image is displayed and various external inputs are sensed. The second peripheral area R-NAA may have a predetermined color. The second peripheral area R-NAA may surround the second active area R-AA. In addition, although not shown in figures, the second display surface RS may further include an electronic module area in which an electronic module including various components is disposed, and the second display surface RS should not be particularly limited.

Referring to FIG. 1D, the display device DD may be folded about the folding axis AX1 to be in an outwardly folded state where one area of the second display surface RS, which overlaps the first non-folding area NFA1, faces the other area of the second display surface RS, which overlaps the second non-folding area NFA2.

However, the display device DD should not be limited thereto or thereby. The display device DD may be folded about a plurality of folding axes such that a portion of the first display surface FS and a portion of the second display surface RS may face each other, and the number of the folding axes and the number of non-folding areas should not be particularly limited.

Figure 2A:
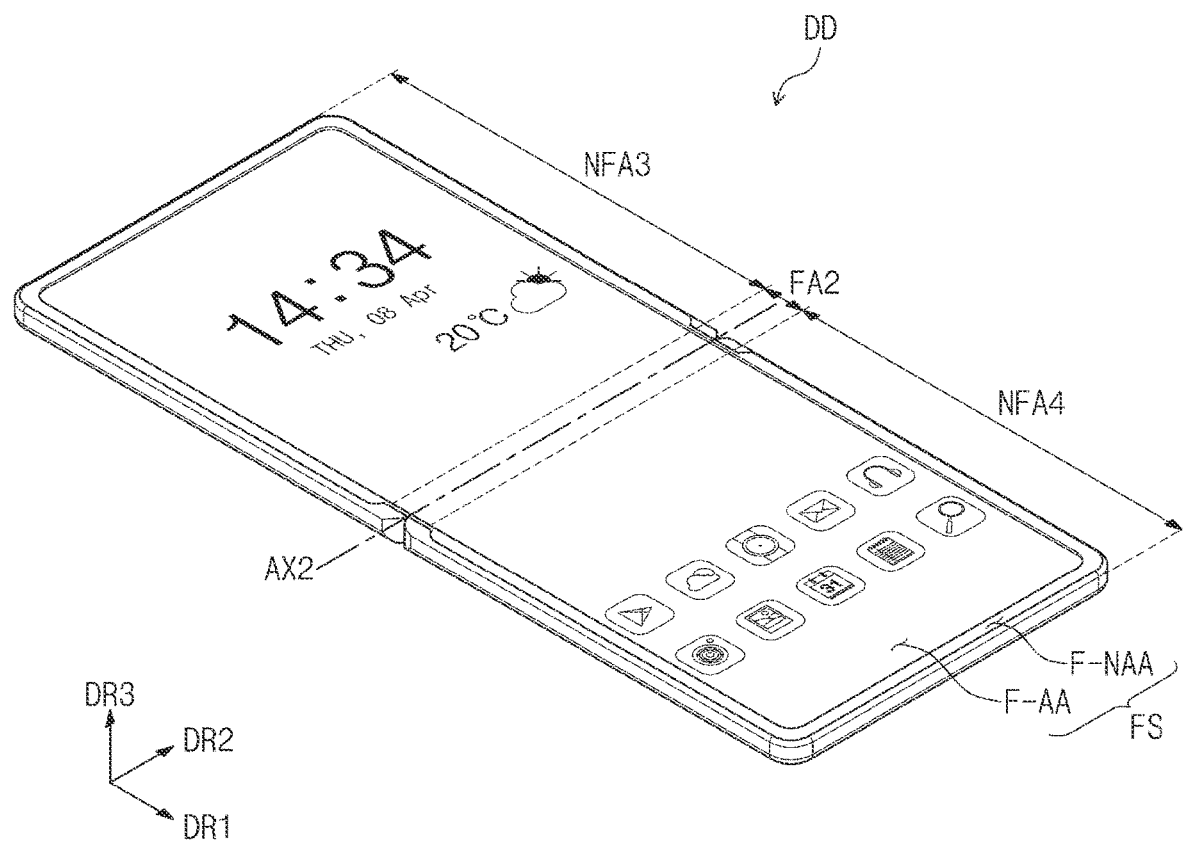
FIG. 2A is a perspective view showing a display device in an unfolded state according to an embodiment of the present disclosure.
Figure 2B:
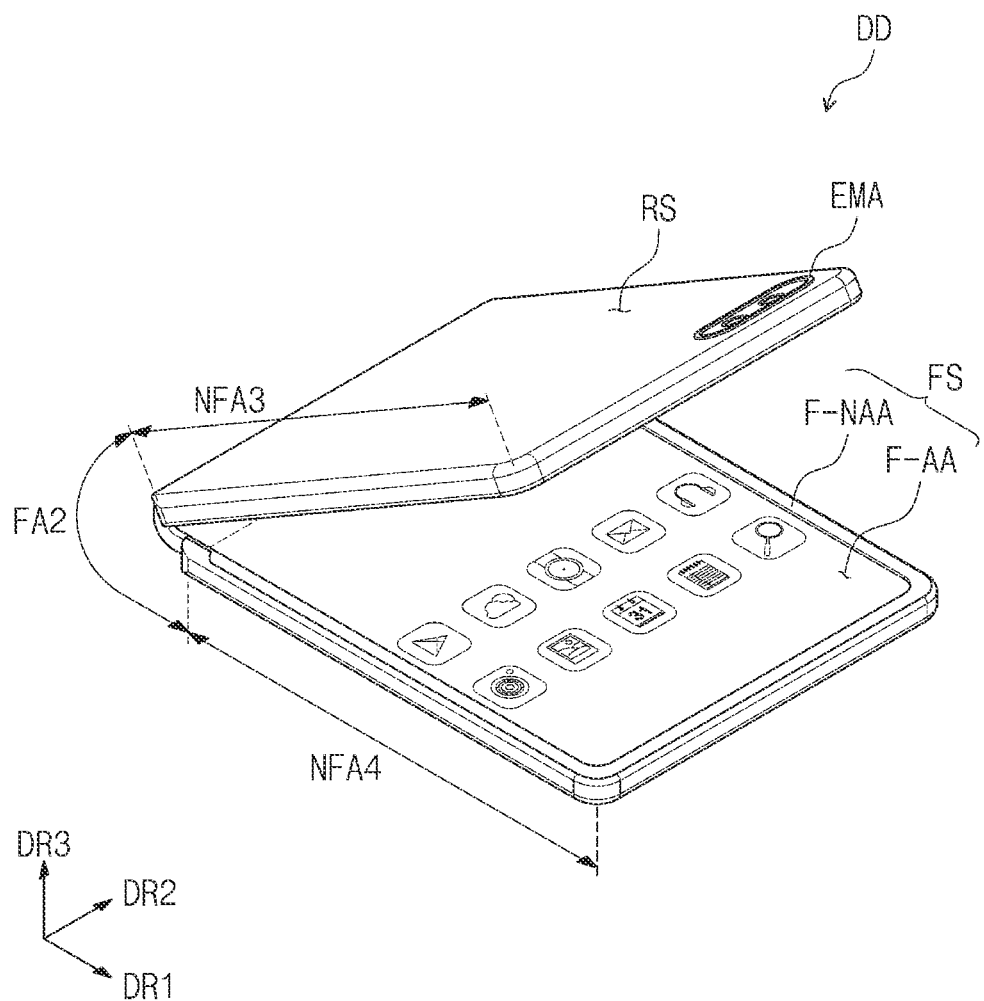
FIG. 2B is a perspective view showing a display device of FIG. 2A being inwardly folded.

FIG. 2A is a perspective view showing a display device DD in an unfolded state according to an embodiment of the present disclosure. FIG. 2B is a perspective view showing the display device DD of FIG. 2A being inwardly folded.

Referring to FIGS. 2A and 2B, the display device DD may be inwardly folded (in-folding) or outwardly folded (out-folding) about a folding axis AX2. The folding axis AX2 may extend in the second direction DR2. The folding axis AX1 shown in FIGS. 1A to 1D may extend along the major axis direction of the display device DD and the folding axis AX2 shown in FIGS. 2A and 2B may extend along a minor axis direction of the display device DD.

A plurality of areas may be defined in the display device DD according to an operation state of the display device DD. The areas may include a folding area FA2 and at least one non-folding area NFA3 and NFA4. The folding area FA2 may be disposed between two non-folding areas NFA3 and NFA4.

The folding area FA2 may be folded about the folding axis AX2 and may substantially form a curvature. As an example, the non-folding areas NFA3 and NFA3 may include a first non-folding area NFA3 and a second non-folding area NFA4. The first non-folding area NFA3 may be disposed adjacent to one side of the folding area FA2 in the first direction DR1, and the second non-folding area NFA4 may be disposed adjacent to the other side of the folding area FA2 in the first direction DR1.

According to the present embodiment, the display device DD may include one folding area FA2 defined therein, however, the present disclosure should not be limited thereto or thereby. According to an embodiment, the display device DD may include a plurality of folding areas defined therein.

The first display surface FS may be viewed by the user when the display device DD is in the unfolded state, and the second display surface RS may be viewed by the user when the display device DD is in the inwardly folded state. The second display surface RS may include an electronic module area EMA in which an electronic module including various components is disposed.

Figure 3:
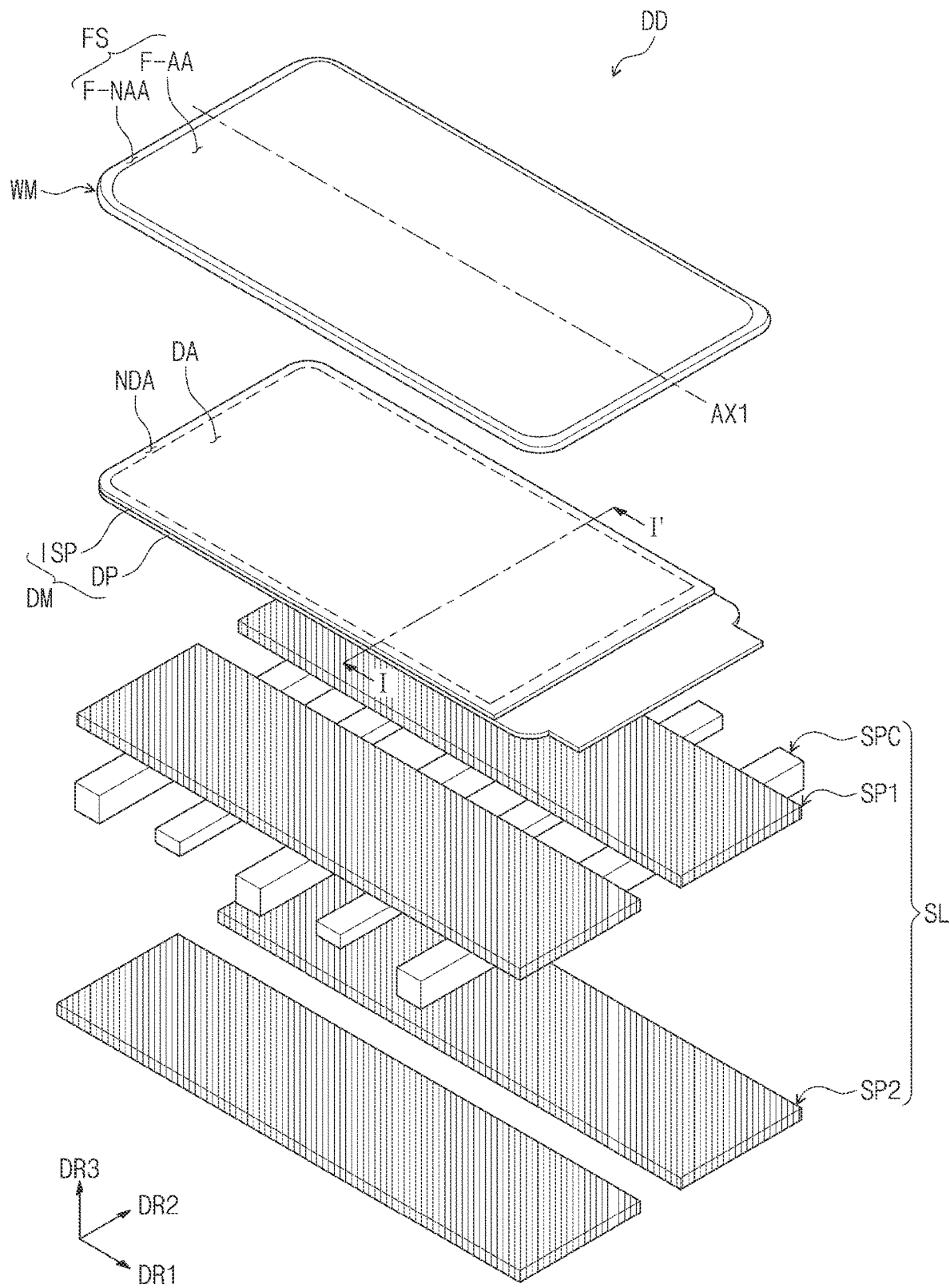
FIG. 3 is an exploded perspective view showing a display device according to an embodiment of the present disclosure.

FIG. 3 is an exploded perspective view showing the display device DD according to an embodiment of the present disclosure.

Referring to FIG. 3, the display device DD may include a display module DM displaying an image, a window WM disposed on the display module DM, and a support layer SL disposed under the display module DM. The display module DM may form a portion of the display device DD, and particularly the image may be generated by the display module DM.

The display module DM may include a display panel DP and an input sensor ISP. According to an embodiment, the display panel DP may be a light emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod. Hereinafter, the organic light emitting display panel will be described as the display panel DP.

The display panel DP may be a flexible display panel. Accordingly, the display panel DP may be entirely rolled or may be folded or unfolded about the folding axis AX1.

The input sensor ISP may be disposed directly on the display panel DP. According to an embodiment, the input sensor ISP may be formed on the display panel DP through successive processes after forming the display panel DP. That is, when the input sensor ISP is disposed directly on the display panel DP, an adhesive film may not be disposed between the input sensor ISP and the display panel DP, however, the present disclosure should not be limited thereto or thereby. According to an embodiment, the adhesive film may be disposed between the input sensor ISP and the display panel DP. In this case, the input sensor ISP is not manufactured together with the display panel DP through the successive processes. That is, the input sensor ISP may be fixed to an upper surface of the display panel DP by the adhesive film after being manufactured through a separate process.

The display panel DP may generate the image, and the input sensor ISP may obtain coordinate information about the user input, e.g., a touch event.

The window WM may include an optically transparent insulating material. Therefore, the user may easily perceive the image generated by the display module DM through the window WM.

For example, the window WM may include a thin film glass or a synthetic resin film. The window WM may include a flexible material. Thus, the window WM may be folded or unfolded about the folding axis AX1. That is, the shape of the window WM may be changed when the shape of the display module DM is changed.

The window WM may transmit the image from the display module DM and may buffer external impacts to prevent the display module DM from being damaged or malfunctioning due to the external impacts. The external impacts indicate an external force, which causes defects in the display module DM such as pressure and stress.

The display module DM may display the image in response to the electrical signals and may transmit/receive information about the external input. The display module DM may include a display area DA and a non-display area NDA. The display area DA may be defined as an area through which the image provided from the display module DM is displayed.

The non-display area NDA may be disposed adjacent to the display area DA. For example, the non-display area NDA may surround the display area DA. However, this is merely one example. The non-display area NDA may have various shapes and should not be particularly limited. According to an embodiment, the display area DA of the display module DM may correspond to at least a portion of the first active area F-AA.

The support layer SL may include a first support plate SP1 and a second support plate SP2 which are disposed on a rear surface of the display module DM to support the display module DM. The first support plate SP1 and the second support plate SP2 may have a plate shape.

According to an embodiment, the first support plate SP1 may include a first plate having a plate shape with a size corresponding to the first non-folding area NFA1 and a second plate having a plate shape with a size corresponding to the second non-folding area NFA2. The second support plate SP2 may include a third plate having a plate shape with a size corresponding to the first non-folding area NFA1 and a fourth plate having a plate shape with a size corresponding to the second non-folding area NFA2.

The support layer SL may include a spacer SPC disposed between the first support plate SP1 and the second support plate SP2. The spacer SPC may include a plurality of main spacers and a plurality of sub-spacers. The main spacers and the sub-spacers may be arranged alternatingly in the first direction DR1. A length of the spacer SPC in the second direction DR2 may be greater than a length of each of the first support plate SP1 and the second support plate SP2 in the second direction DR2. The main spacers and the sub-spacers may have substantially the same length in the second direction DR2 and may have different thicknesses, i.e., a length in the third direction DR3.

The first support plate SP1 and the second support plate SP2 may be spaced apart from each other in the third direction DR3 with the spacer SPC interposed between the first support plate SP1 and the second support plate SP2. As the support layer SL includes the spacer SPC disposed between the first support plate SP1 and the second support plate SP2, a resistance against a pressure caused by the external impact may increase, and a support force for the display panel DP may be improved.

Figure 4:
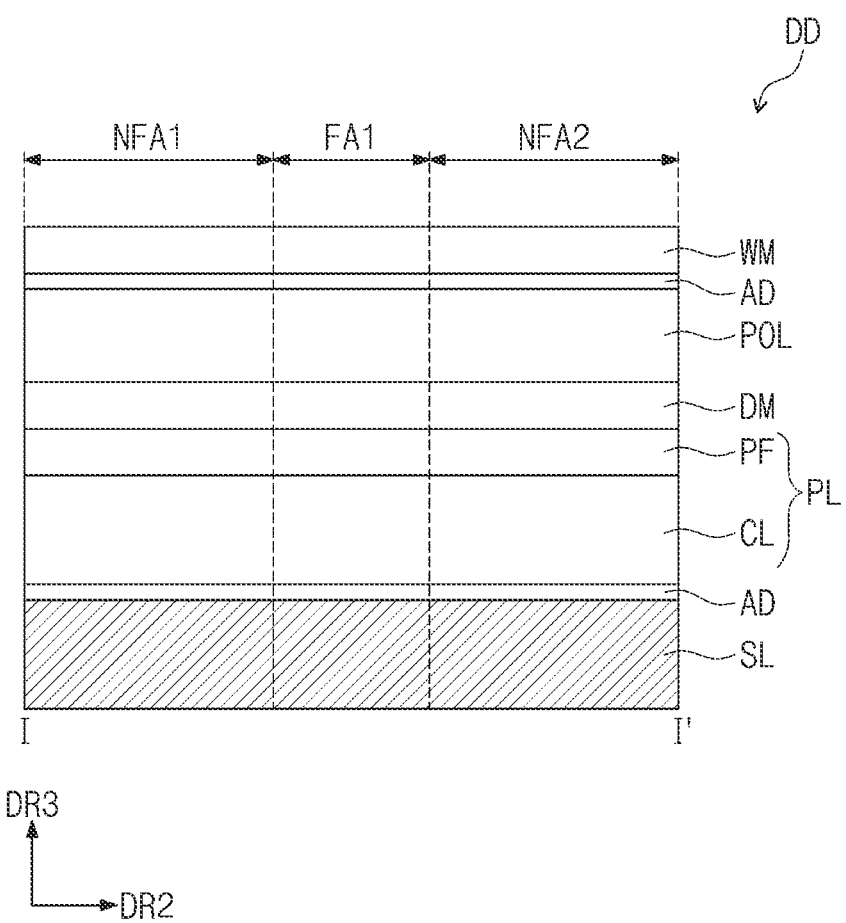
FIG. 4 is a cross-sectional view showing a display device according to an embodiment of the present disclosure.

FIG. 4 is a cross-sectional view showing the display device DD according to an embodiment of the present disclosure. FIG. 4 is a cross-sectional view taken along a line I-I' of FIG. 3.

Referring to FIG. 4, the display device DD may include the window WM, an anti-reflective layer POL, the display module DM, a protective layer PL, and the support layer SL. Hereinafter, details of the same elements described with reference to FIGS. 1A to 3 will be omitted.

The anti-reflective layer POL may be disposed between the window WM and the display module DM. An adhesive layer AD may be disposed between the window WM and the anti-reflective layer POL. The adhesive layer AD may include a pressure sensitive adhesive (PSA), an optical clear adhesive (OCA), or an optical clear resin (OCR). The anti-reflective layer POL may prevent components included in the display module DM from being perceived from the outside due to the external light incident through the front surface of the display device DD. The anti-reflective layer POL may include a retarder and/or a polarizer. The retarder may be a film type or liquid crystal coating type and may include a 212 retarder and/or a 214 retarder. The polarizer may be a film type or liquid crystal coating type. The film type may include a stretch type synthetic resin film, and the liquid crystal coating type may include liquid crystals aligned in a predetermined alignment. The stretch type synthetic resin film may be provided by adsorbing iodine compound to a polyvinyl alcohol (PVA) film. The retarder and the polarizer may be implemented as a single polarizing film.

The protective layer PL may be disposed under the display module DM. The protective layer PL may include a protective film PF and a cushion layer CL.

The protective film PF may be disposed under the display module DM. The protective film PF disposed under the display module DM may protect the rear surface of the display module DM. The protective film PF may include a synthetic resin film, e.g., a polyimide film or a polyethylene terephthalate film, however, the protective film PF should not be limited thereto or thereby.

The cushion layer CL may be disposed under the protective film PF. The cushion layer CL may include a sponge, a foam, or a urethane resin. The cushion layer CL may prevent a support layer SL from being pressed and plastic-deformed due to external impact and force. That is, the cushion layer CL may improve the impact resistance of the display device DD.

As an example, the cushion layer CL may include an elastomer. For example, the cushion layer CL may include polyurethane. In the case where the cushion layer CL includes polyurethane, the cushion layer CL may have a thickness from about 100 µm to about 150 µm.

In the case where the protective layer PL includes the cushion layer CL, although the support layer SL is deformed due to the folding operation, the deformation of the support layer SL may not be transmitted to the display module DM. Accordingly, the deformation occurred in the support layer SL, such as flexure, is viewed through the display module DM may be prevented and improved.

The cushion layer CL may be coupled with the support layer SL by the adhesive layer AD. The adhesive layer AD may include a pressure sensitive adhesive (PSA), an optical clear adhesive (OCA), or an optical clear resin (OCR) and may include an adhesive film or an adhesive tape that is provided in the form of film or tape.

The support layer SL may be disposed under the protective layer PL and may support the display module DM. The support layer SL will be described in detail with reference to FIGS. 5 to 8B.

Figure 5:
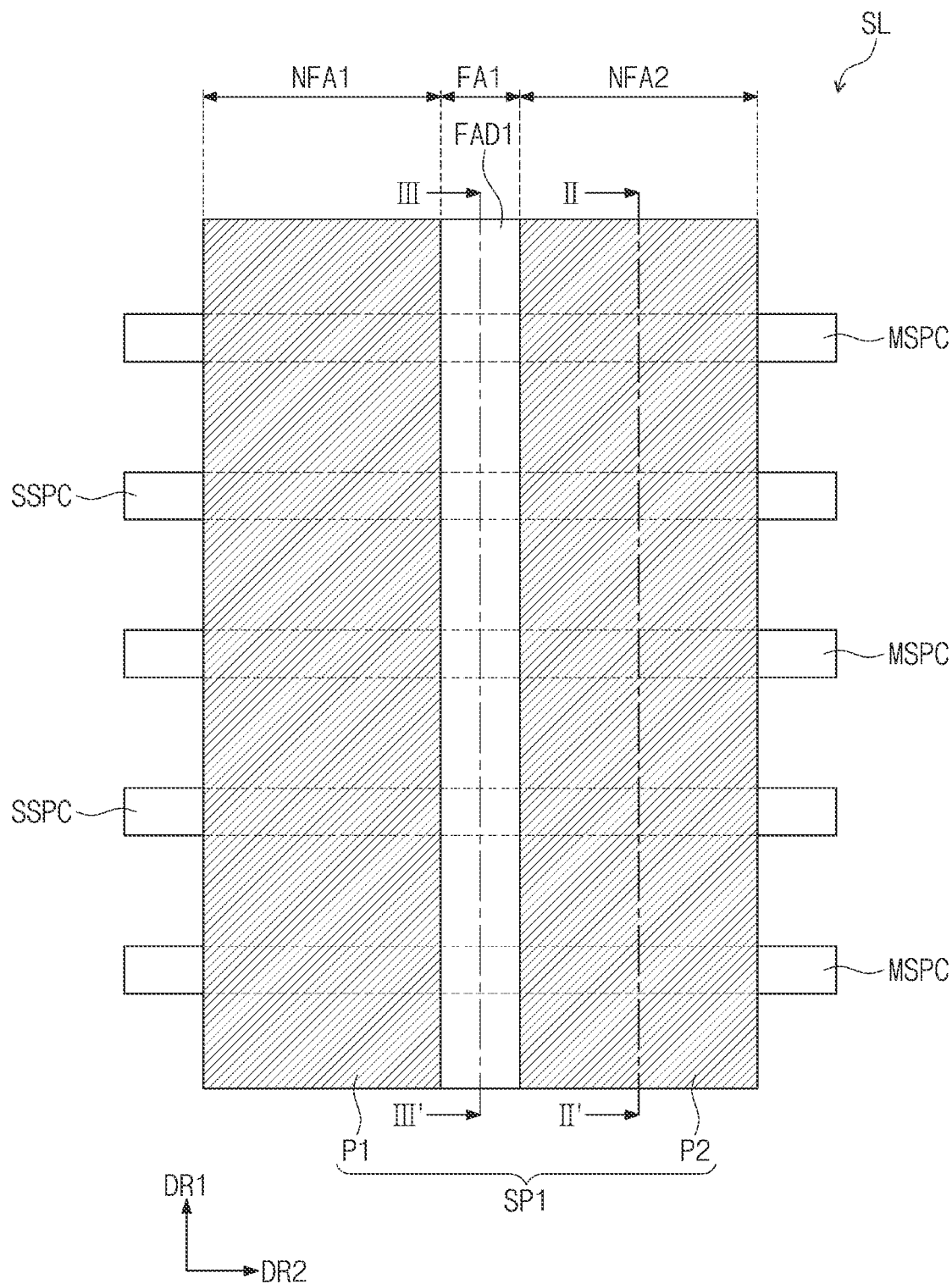
FIG. 5 is a plan view showing a support layer according to an embodiment of the present disclosure.
Figure 6A:
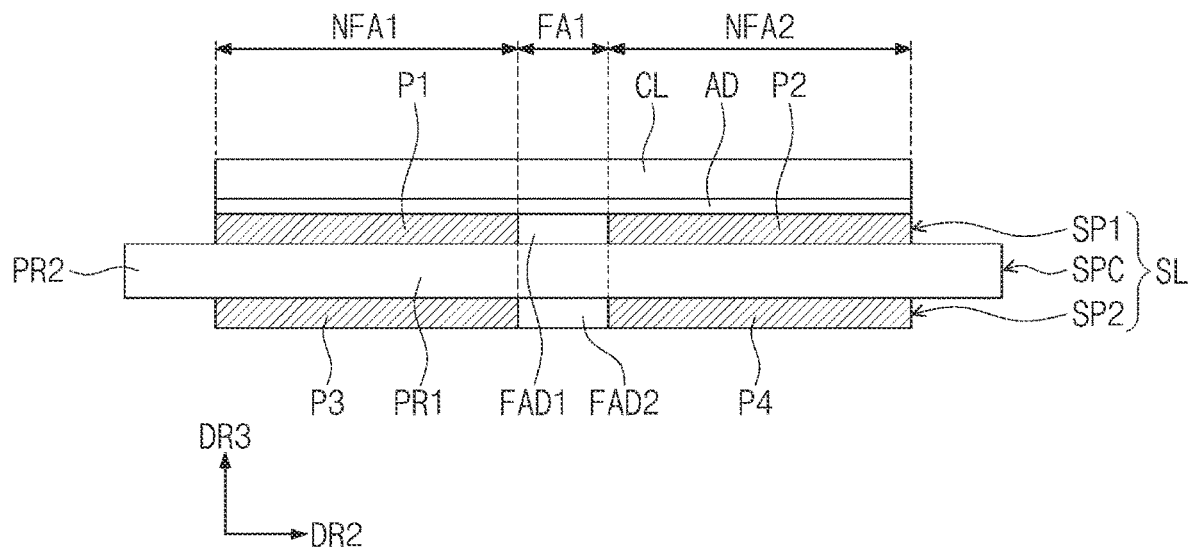
FIGS. 6A and 6B are cross-sectional views showing a support layer according to an embodiment of the present disclosure.
Figure 6B:
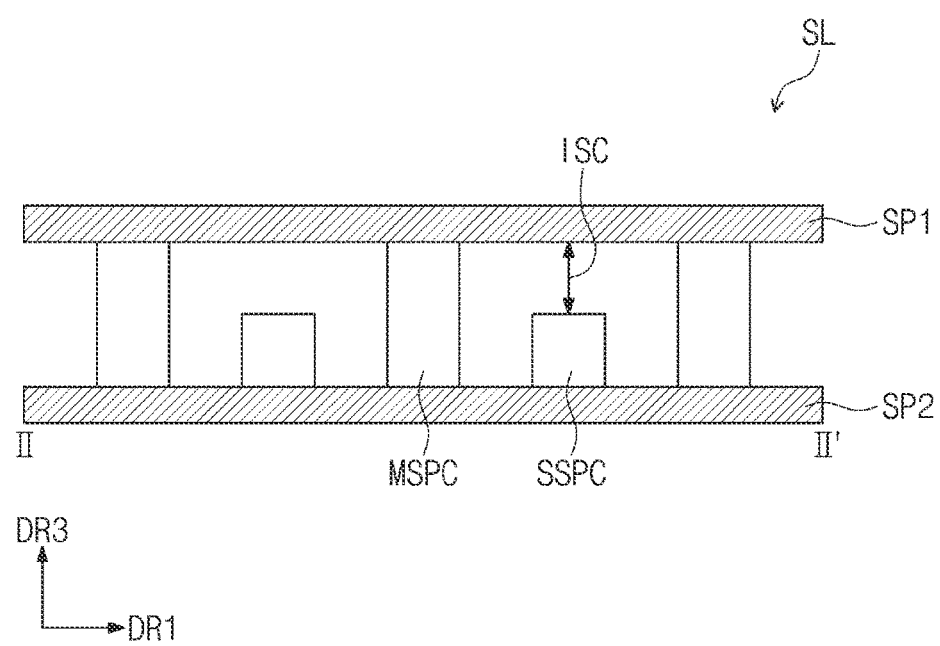

FIG. 5 is a plan view showing the support layer SL according to an embodiment of the present disclosure. FIGS. 6A and 6B are cross-sectional views showing the support layer SL according to an embodiment of the present disclosure.

The spacer SPC may include the main spacer MSPC and the sub-spacer SSPC. FIG. 5 shows three main spacers MSPC and two sub-spacers SSPC, however, the number of the main spacers MSPC and the number of the sub-spacers SSPC should not be limited thereto or thereby, and the spacer SPC may be provided in plural.

In FIG. 5, the main spacer MSPC and the sub-spacer SSPC may be alternately arranged with each other in the first direction DR1. That is, the sub-spacer SSPC may be disposed between the main spacers MSPC, however, it should not be limited thereto or thereby. According an embodiment, the sub-spacers SSPC may be disposed outside, and the main spacer MSPC may be disposed between the sub-spacers SSPC.

The main spacer MSPC and the sub-spacer SSPC may have substantially the same width, i.e., a length in the first direction DR1. The main spacer MSPC and the sub-spacer SSPC may have substantially the same length in the second direction DR2. The length in the second direction DR2 of the main spacer MSPC and the sub-spacer SSPC may be longer than the length of the first support plate SP1 in the second direction DR2. Therefore, portions of the main spacer MSPC and the sub-spacer SSPC may be exposed to the outside of the first support plate SP1 in a plan view.

The first support plate SP1 shown in FIG. 5 may include the first plate P1 and the second plate P2. The first plate P1 may overlap the first non-folding area NFA1, and the second plate P2 may overlap the second non-folding area NFA2. The first plate P1 and the second plate P2 may be spaced apart from each other in the second direction DR2.

According to an embodiment, a first adhesive FAD1 may be disposed between the first plate P1 and the second plate P2. The first adhesive FAD1 may include a pressure sensitive adhesive (PSA), an optical clear adhesive (OCA), or an optical clear resin (OCR). The first adhesive FAD1 may include a flexible adhesive. According to an embodiment, the first plate P1 and the second plate P2 may be disposed to be separated from each other, and an empty space may be disposed between the first plate P1 and the second plate P2.

FIG. 6A is a cross-sectional view showing the support layer SL of FIG. 5 when viewed in the first direction DR1, and FIG. 6B is a cross-sectional view taken along a line II-II' of FIG. 5.

Referring to FIG. 6A, the support layer SL may be disposed under the cushion layer CL, and the adhesive layer AD may be disposed between the cushion layer CL and the support layer SL. The support layer SL may include the first support plate SP1, the second support plate SP2, and the spacer SPC disposed between the first support plate SP1 and the second support plate SP2.

The first support plate SP1 may include the first plate P1 disposed to correspond to the first non-folding area NFA1 of the display module DM (refer to FIG. 4) and the second plate P2 spaced apart from the first plate P1 with the folding area FA disposed between the first plate P1 and the second plate P2, and disposed to correspond to the second non-folding area NFA2. The second support plate SP2 may include the third plate P3 disposed to correspond to the first plate P1 and the fourth plate P4 spaced apart from the third plate P3 with the folding area FA disposed between the third plate P3 and the fourth plate P4 and disposed to correspond to the second plate P2.

Each of the first support plate SP1 and the second support plate SP2 may include a fiber reinforced plastic. As an example, the first support plate SP1 and the second support plate SP2 may include a carbon reinforced fiber and/or a glass reinforced fiber, however, they should not be limited thereto or thereby. Each of the first support plate SP1 and the second support plate SP2 may include a metal material. Each of the first support plate SP1 and the second support plate SP2 may include a single metal material or an alloy of metal materials.

The first adhesive FAD1 may be disposed between the first plate P1 and the second plate P2 to fill an empty space between the first plate P1 and the second plate P2, and a second adhesive member FAD2 may be disposed between the third plate P3 and the fourth plate P4 to fill an empty space between the third plate P3 and the fourth plate P4. The first adhesive FAD1 and the second adhesive member FAD2 may include substantially the same material as each other. As an example, the first adhesive FAD1 and the second adhesive member FAD2 may include a flexible adhesive. According to an embodiment, empty spaces may be formed between the first plate P1 and the second plate P2 and between the third plate P3 and the fourth plate P4, and the empty spaces may not be filled with the first adhesive FAD1 and the second adhesive FAD2. That is, the first adhesive FAD1 and the second adhesive FAD2 may be omitted.

The spacer SPC may include an elastic resin, a carbon fiber, or a glass fiber. The spacer SPC may be formed of an elastic material, and thus, the spacer SPC may have flexibility. A method of forming the spacer SPC should not be particularly limited and the spacer SPC may be formed by a photolithography process.

According to an embodiment, spacer SPC may include a first portion PR1 that overlaps the first support plate SP1 and the second support plate SP2 in a plan view and second portions PR2 that extend from the first portion PR1 to both opposite directions in the second direction DR2 and do not overlap with the first support plate SP1 and the second support plate SP2. That is, the length in the second direction DR2 of the spacer SPC may be longer than the length in the second direction DR2 of the first support plate SP1 and the second support plate SP2 by a length of the second portions PR2.

Referring to FIG. 6B, the spacer may include the main spacer MSPC and the sub-spacer SSPC which are alternately arranged with each other in the first direction DR1. Each of the main spacer MSPC and the sub-spacer SSPC may be provided in plural. Each of the main spacers MSPC and each of the sub-spacers SSPC may be alternately arranged with each other. The main spacers MSPC and the sub-spacers SSPC may be spaced apart from each other. A distance between the main spacer MSPC and the sub-spacer SSPC should not be particularly limited and may be adjusted by a size, a position, and a material thereof.

The main spacer MSPC may have the thickness greater than the thickness of the sub-spacer SSPC. In this case, the thickness indicates a length in the third direction DR3. The thickness of the main spacer MSPC may be substantially the same as a distance between the first support plate SP1 and the second support plate SP2 in the third direction DR3. That is, the main spacer MSPC may be disposed to make contact with both the first support plate SP1 and the second support plate SP2.

According to the present embodiment, since the support layer SL includes the main spacer MSPC having the same length in the third thickness DR3 as a gap between the first support plate SP1 and the second support plate SP2, the support layer SL may have a good shear stress and may be lighter than conventional support layers which does not include an empty space in the support layer and is form with a single piece plate. Accordingly, the display device DD including the support layer SL may reduce a weight thereof while maintaining or improving its durability.

The thickness of the sub-spacer SSPC may be smaller than a distance between the first support plate SP1 and the second support plate SP2 in the third direction DR3. That is, the sub-spacer SSPC may be disposed to make contact with only one of the first support plate SP1 and the second support plate SP2. In FIG. 6B, the sub-spacer SSPC is disposed to make contact with the second support plate SP2, however, according to an embodiment, the sub-spacer SSPC may be disposed to make contact with the first support plate SP1.

A first inner space ISC may be formed between the first support plate SP1, which does not make contact with the sub-spacer SSPC, and the sub-spacer SSPC.

The support layer SL may have an excellent strain resistance property by the first inner space ISC formed between the first support plate SP1 and the second support plate SP2. Accordingly, the display device DD including the support layer SL may have improved reliability in the folding or sliding operation thereof. The thickness of the sub-spacer SSPC may be smaller than that of the main spacer MSPC. The thickness of the sub-spacer SSPC should not be particularly limited as long as it is smaller than that of the main spacer MSPC and may be adjusted by a size, a position, and a material of the sub-spacer SSPC.

Figure 7A:
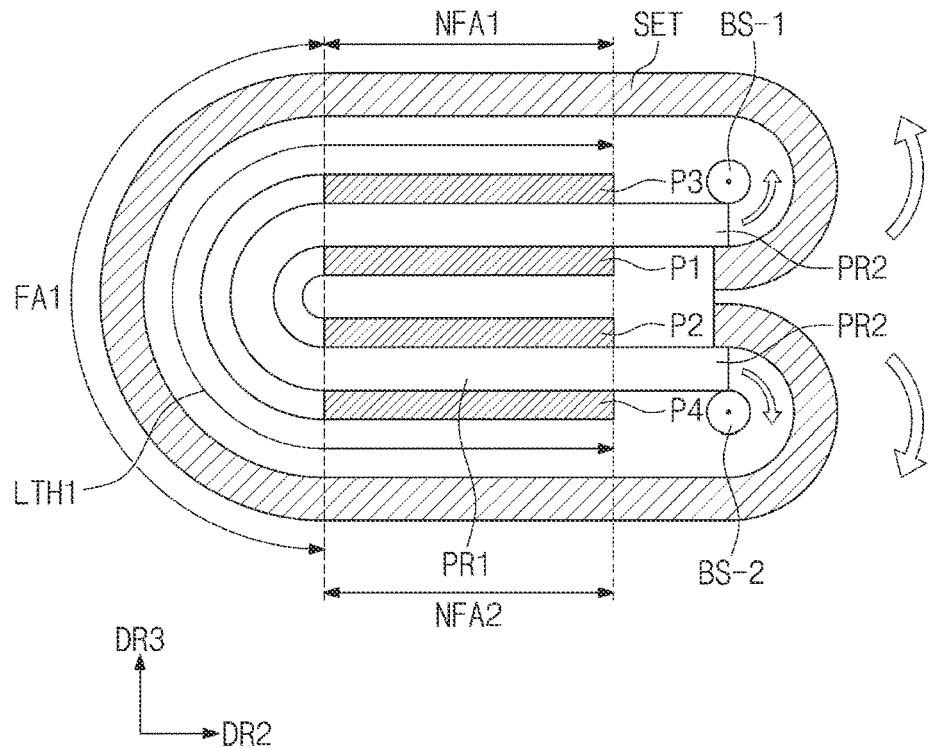
FIGS. 7A and 7B are cross-sectional views showing folding and unfolding operations of a support layer according to an embodiment of the present disclosure.
Figure 7B:
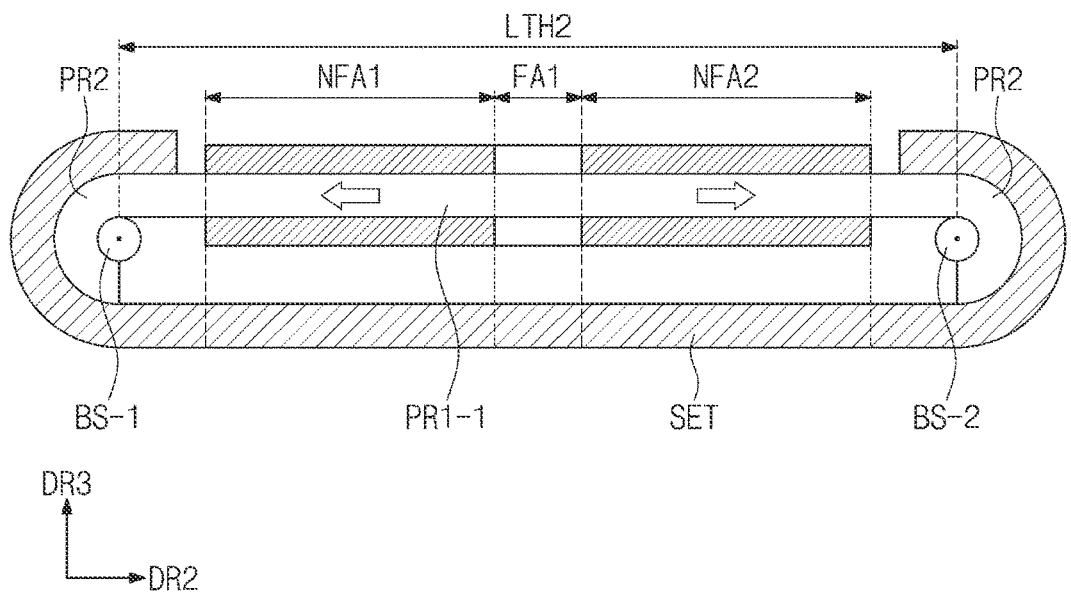

FIGS. 7A and 7B are cross-sectional views showing folding and unfolding operations of the support layer SL according to an embodiment of the present disclosure.

FIG. 7A shows the support layer SL that is folded, and FIG. 7B shows the support layer SL that is unfolded. That is, FIG. 7A shows a first mode in which the display device DD (refer to FIG. 4) is folded, and FIG. 7B shows a second mode in which the display device DD (refer to FIG. 4) is unfolded.

In FIGS. 7A and 7B, the display device DD (refer to FIG. 4) may further include a cover SET. The cover SET may be disposed under the second support plate SP2. The cover SET may be disposed to surround the support layer SL of the display device DD. The cover SET may serve as a case disposed at an outermost position of the display device DD.

According to an embodiment, the cover SET may include a first fixing portion BS-1 and a second fixing portion BS-2. The first fixing portion BS-1 may fix one of the second portions PR2 of the spacer SPC, and the second fixing portion BS-2 may fix the other of the second portions PR2 of the spacer SPC. That is, the second portions PR2 of the spacer SPC disposed at distal ends of the spacer SPC may be fixed to the cover SRT using the first fixing portion BS-1 and the second fixing portion BS-2.

In FIG. 7A, the first fixing portion BS-1 and the second fixing portion BS-2 may fix the distal ends of the spacer SPC to the cover SRT in the first mode in which the support layer SL of the display device DD is folded. In FIG. 7B, the first fixing portion BS-1 and the second fixing portion BS-2 may stretch the spacer SPC in the second mode in which the support layer SL of the display device DD is unfolded.

As an example, when the support layer SL is unfolded from the first mode to the second mode, the first fixing portion BS-1 and the second fixing portion BS-2 may stretch the first portion PR1 of the spacer SPC by pulling the second portions PR2 at both sides of the spacer SPC in different directions away from the first portion PR1, respectively.

According to an embodiment, the first fixing portion BS-1 and the second fixing portion BS-2 may have a roller shape. That is, the first fixing portion BS-1 may be a first roller BS-1, and the second fixing portion BS-2 may be a second roller BS-2. The first roller BS-1 and the second roller BS-2 may unwind the second portions PR2 of the spacer SPC in the first mode of the display device DD and may wind the second portions PR2 of the spacer SPC in the second mode of the display device DD.

That is, when the first mode is switched to the second mode, the second portions PR2 may be wound around the first roller BS-1 and the second roller BS-2 and may move in a direction away from the first portion PR1. Accordingly, the first portion PR1 may be stretched in the second direction DR2. A tensile force applied to the first portion PR1 of the spacer SPC in the first mode in which the display device DD is folded may be smaller than a tensile force applied to a first portion PR1-1 of the spacer SPC in the second mode in which the display device DD is unfolded.

The stretched spacer SPC may reduce a bending strain of the display device DD in the unfolded state, may prevent the display device DD from being pressed, and may increase an impact resistance.

Accordingly, a length LTH2 of the first portion PR1-1 in the second mode of the display device DD may be greater than a length LTH1 of the first portion PR1 in the first mode of the display device DD.

Figure 8A:
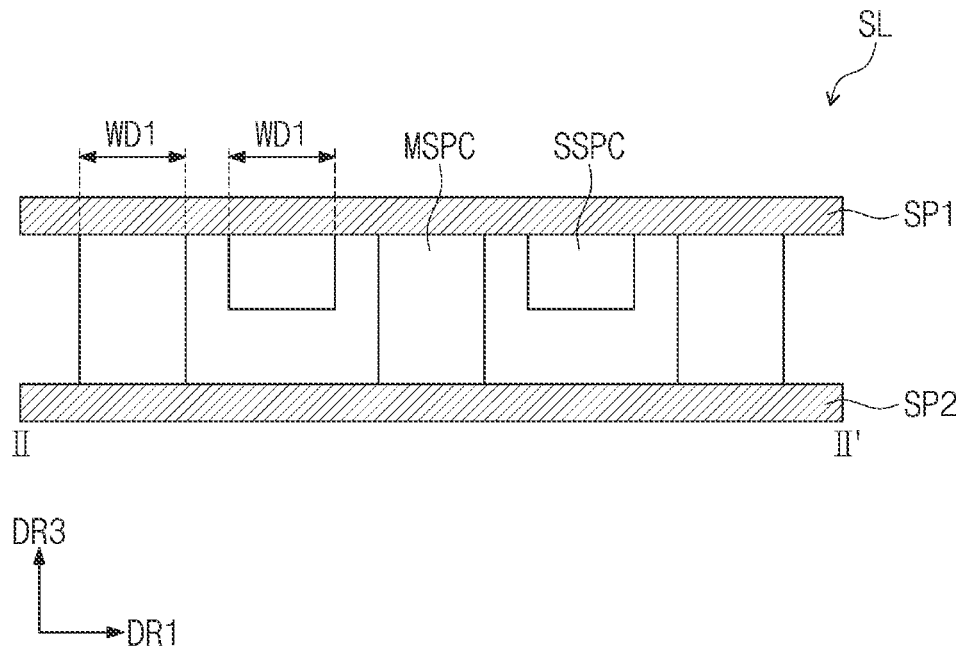
FIGS. 8A and 8B are cross-sectional views showing support layers according to an embodiment of the present disclosure.
Figure 8B:
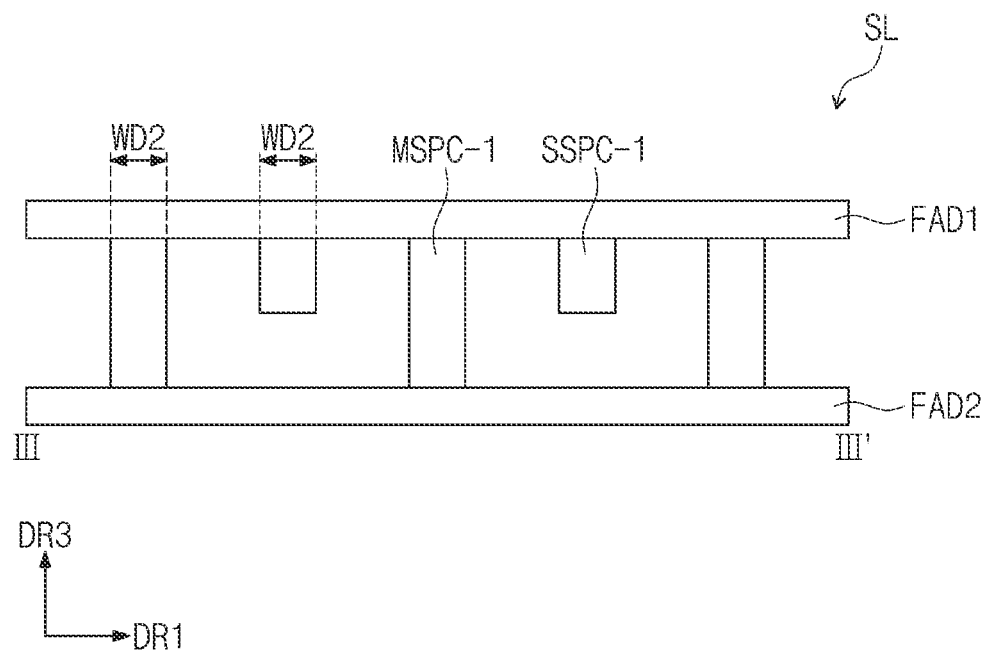

FIGS. 8A and 8B are cross-sectional views showing support layers SL according to an embodiment of the present disclosure. FIG. 8A is a cross-sectional view taken along a line II-II' of FIG. 5. FIG. 8B is a cross-sectional view taken along a line of FIG. 5.

In FIG. 8A, a main spacer MSPC and a sub-spacer SSPC may have the same first width WD1. That is, each of the main spacer MSPC and the sub-spacer SSPC, which overlap with the first and/or second non-folding areas NFA1 and NFA2, may have the first width WD1.

In FIG. 8B, a main spacer MSPC-1 and a sub-spacer SSPC-1 may have the same second width WD2. That is, each of the main spacer MSPC-1 and the sub-spacer SSPC-1, which overlap the folding area FA1, may have the second width WD2.

The first width WD1 may be greater than the second width WD2. That is, since the second width WD2 of the main spacer MSPC-1 and the sub-spacer SSPC-1, which are disposed to overlap the folding area FA1, is smaller than the first width WD1, the support layer SL may be easily folded when the display device DD (refer to FIG. 4) is folded.

Figure 9:
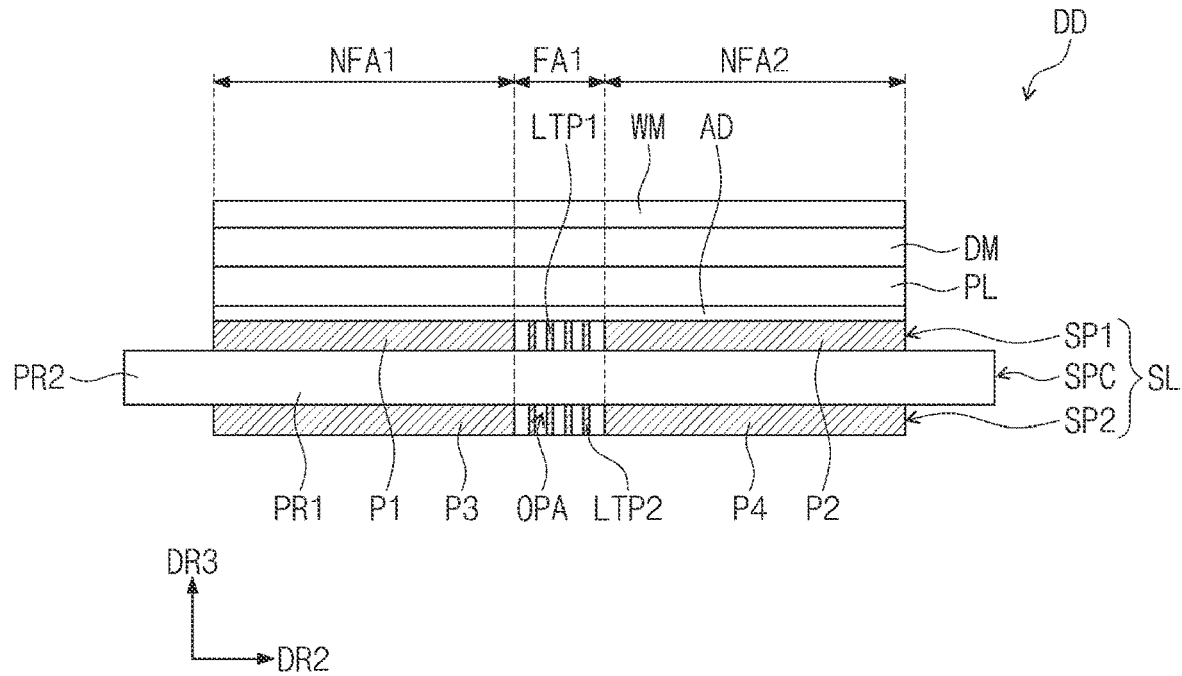
FIG. 9 is a cross-sectional view showing a display device according to an embodiment of the present disclosure.

FIG. 9 is a cross-sectional view showing a display device DD according to an embodiment of the present disclosure.

In FIG. 9, a first support plate SP1 may include a first lattice portion LTP1 overlapping a folding area FA1 and a second support plate SP2 may include a second lattice portion LTP2 overlapping the folding area FA1. Each of the first lattice portion LTP1 and the second lattice portion LTP2 may include a plurality of opening areas OPA.

Figure 10:
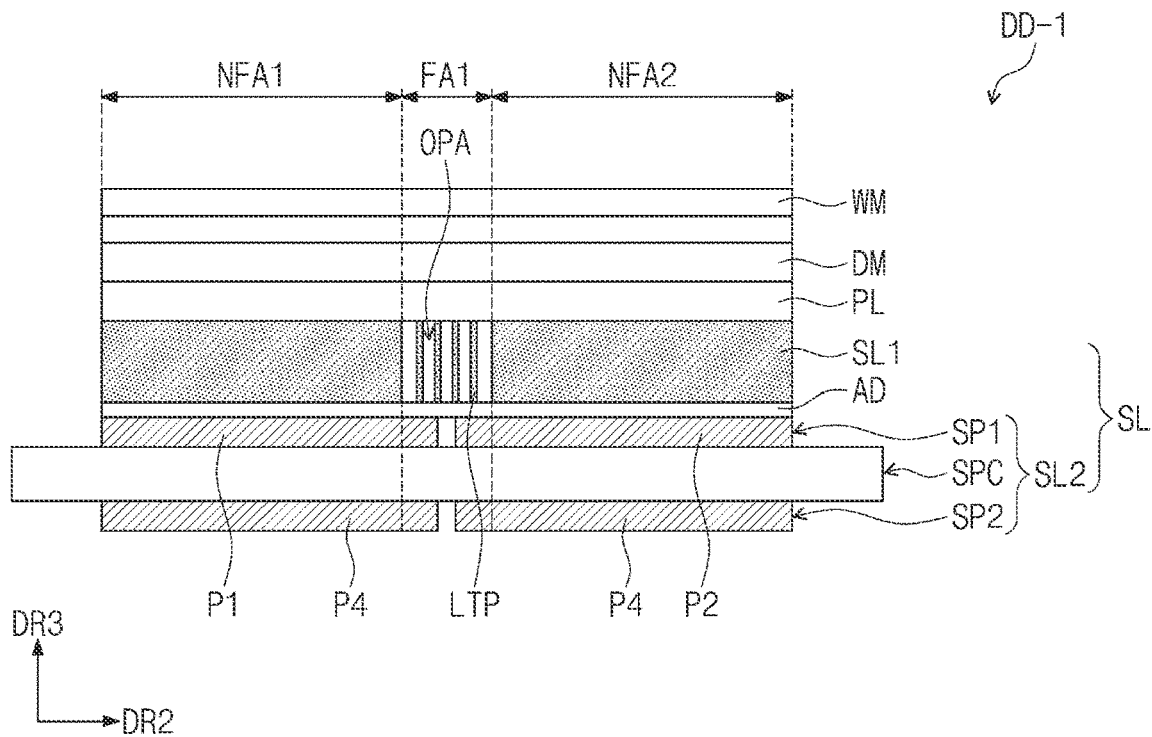
FIG. 10 is a cross-sectional view showing a display device according to an embodiment of the present disclosure.

FIG. 10 is a cross-sectional view showing a display device DD-1 according to an embodiment of the present disclosure.

Referring to FIG. 10, the display device DD-1 may include a window WM, a display module DM, a protective layer PL, a first support layer SL1, and a second support layer SL2.

The first support layer SL1 may be disposed under the protective layer PL, and the second support layer SL2 may be disposed under the first support layer SL1. The first support layer SL1 may include a lattice portion LTP overlapping a folding area FA1. The first support layer SL1 may include a metal plate. The lattice portion LTP may include a plurality of opening areas OPA.

The second support layer SL2 may be disposed under the first support layer SL1 and may include a first support plate SP1, a second support plate SP2, and a spacer SPC. The first support plate SP1 may include a first plate P1 and a second plate P2, which are spaced apart from each other in the folding area FA1, and the second support plate SP2 may include a third plate P3 and a fourth plate P4, which are spaced apart from each other in the folding area FA1. The spacer SPC may be disposed between the first support plate SP1 and the second support plate SP2.

According to the present embodiment, the second support layer SL2 may correspond to the support layer SL of FIGS. 4 to 8B. Thus, detailed descriptions of the second support layer SL2 will be omitted.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A display device comprising:
   a display module comprising a first non-folding area, a second non-folding area, and a folding area disposed between the first non-folding area and the second non-folding area; and
   a support layer disposed under the display module, the support layer comprising:
   a first support plate;

a second support plate disposed under the first support plate; and
a spacer disposed between the first support plate and the second support plate, wherein the spacer comprises a main spacer and a sub-spacer alternately arranged with the main spacer in a first direction, the main spacer has a thickness greater than a thickness of the sub-spacer, and a length of the spacer in a second direction crossing the first direction is greater than a length of the first support plate in the second direction.

2. The display device of claim 1, wherein each of the main spacer and the sub-spacer is provided in plural and the main spacers are spaced apart from the sub-spacers in the first direction.

3. The display device of claim 1, wherein the first support plate comprises:
a first plate disposed to correspond to the first non-folding area of the display module; and
a second plate spaced apart from the first plate in the folding area and disposed to correspond to the second non-folding area of the display module, and
wherein the second support plate comprises:
a third plate disposed to correspond to the first plate; and
a fourth plate spaced apart from the third plate in the folding area and disposed to correspond to the second plate.

4. The display device of claim 3, further comprising:
a first adhesive disposed between the first plate and the second plate; and
a second adhesive disposed between the third plate and the fourth plate,
wherein the first adhesive and the second adhesive comprise a flexible adhesive.

5. The display device of claim 1, wherein the spacer comprises an elastic resin, a carbon fiber, or a glass fiber.

6. The display device of claim 1, wherein the spacer comprises:
a first portion that overlaps the first support plate and the second support plate in a plan view; and
a plurality of second portions that extends from the first portion to the second direction and does not overlap the first support plate and the second support plate.

7. The display device of claim 6, wherein the first portion of the spacer has a first state in a first mode in which the support layer is folded and has a second state in which the first portion is stretched in the second direction in a second mode in which the support layer is unfolded.

8. The display device of claim 7, further comprising a cover disposed under the second support plate,
wherein the cover comprises a first roller and a second roller disposed at distal ends of the spacer, and the second portions of the spacer are respectively fixed to the first roller and the second roller.

9. The display device of claim 8, wherein, when the first mode is switched to the second mode, the second portions are wound around the first roller and the second roller, and move in a direction away from the first portion.

10. The display device of claim 9, wherein a length of the first portion in the second mode is greater than a length of the first portion in the first mode.

11. The display device of claim 7, further comprising a cover disposed under the second support plate,
wherein the cover comprises a first fixing portion and a second fixing portion respectively fixing the second portions in the first mode and moving the second portions in a direction away from the first portion to stretch the first portion in the second mode.

12. The display device of claim 1, wherein the main spacer is in contact with the first support plate and the second support plate, the sub-spacer is in contact with only one of the first support plate and the second support plate, and a first inner space is formed between the sub-spacer and the other of the first support plate and the second support plate.

13. The display device of claim 1, wherein the first support plate comprises a first lattice portion overlapping the folding area and provided with a plurality of opening areas, and the second support plate comprises a second lattice portion overlapping the folding area and provided with a plurality of opening areas.

14. The display device of claim 1, wherein the spacer has a first width in an area overlapping the first and second non-folding areas, and has a second width in an area overlapping the folding area, and
wherein the first width is greater than the second width.

15. A display device comprising:
a display module comprising a first non-folding area, a second non-folding area, and a folding area disposed between the first non-folding area and the second non-folding area; and
a support layer disposed under the display module, the support layer comprising:
a first support plate;
a second support plate disposed under the first support plate; and
a spacer disposed between the first support plate and the second support plate, wherein a tensile force applied to the spacer is smaller in a first mode in which the spacer is folded than in a second mode in which the spacer is unfolded.

16. The display device of claim 15, wherein the spacer comprises:
a first portion that overlaps with the first support plate; and
a second portion that extends from the first portion and does not overlap the first support plate, and
wherein a length of the first portion in the first mode is smaller than a length of the first portion in the second mode.

17. The display device of claim 16, further comprising a cover disposed under the support layer, and the cover includes a fixing portion for fixing the second portion, and moving the fixed second portion in a direction away from the first portion to stretch the first portion in the second mode.

18. The display device of claim 15, wherein the spacer comprises a main spacer and a sub-spacer alternately arranged with the main spacer in a first direction, and
wherein the main spacer has a thickness greater than a thickness of the sub-spacer.

19. The display device of claim 15, further comprising a protective layer disposed between the display module and the support layer.

20. A display device comprising:
a display module comprising a first non-folding area, a second non-folding area, and a folding area defined between the first non-folding area and the second non-folding area;
a first support layer disposed under the display module and comprising a lattice portion overlapping the folding area and provided with a plurality of opening areas defined therein; and
a second support layer disposed under the first support layer, the second support layer comprising:
a first support plate;

a second support plate disposed under the first support plate; and a spacer disposed between the first support plate and the second support plate, wherein the spacer comprises a main spacer and a sub-spacer alternately arranged with the main spacer in a first direction, the main spacer has a thickness greater than a thickness of the sub-spacer, and a length of the spacer in a second direction crossing the first direction is greater than a length of the first support plate in the second direction.

21. The display device of claim 20, wherein the first support plate comprises:

a first plate disposed to correspond to the first non-folding area of the display module; and a second plate spaced apart from the first plate in the folding area and disposed to correspond to the second non-folding area of the display module, and wherein the second support plate comprises:

a third plate disposed to correspond to the first plate; and a fourth plate spaced apart from the third plate in the folding area and disposed to correspond to the second plate.

\* \* \* \* \*